(12) United States Patent
Littmann

(10) Patent No.: US 11,315,696 B2
(45) Date of Patent: Apr. 26, 2022

(54) SEALING BOLT, LOCKING SYSTEM AND METHOD OF LOCKING/UNLOCKING

(71) Applicant: THE EUROPEAN ATOMIC ENERGY COMMUNITY (EURATOM), REPRESENTED BY THE EUROPEAN COMMISSION, Brussels (BE)

(72) Inventor: François Littmann, Trevisago (IT)

(73) Assignee: THE EUROPEAN ATOMIC ENERGY COMMUNITY (EURATOM), REPRESENTED BY THE EUROPEAN COMMISSION, Brussels (BE)

( * ) Notice: Subject to any disclaimer, the term of this patent is extended or adjusted under 35 U.S.C. 154(b) by 147 days.

(21) Appl. No.: 16/323,506

(22) PCT Filed: Aug. 28, 2017

(86) PCT No.: PCT/EP2017/071518
§ 371 (c)(1),
(2) Date: Feb. 5, 2019

(87) PCT Pub. No.: WO2018/037131
PCT Pub. Date: Mar. 1, 2018

(65) Prior Publication Data
US 2019/0180887 A1 Jun. 13, 2019

(30) Foreign Application Priority Data
Aug. 26, 2016 (EP) .................................... 16185837

(51) Int. Cl.
*G21F 5/12* (2006.01)
*F16B 35/04* (2006.01)
(Continued)

(52) U.S. Cl.
CPC .................. *G21F 5/12* (2013.01); *B65B 7/00* (2013.01); *F16B 35/041* (2013.01); *F16B 35/06* (2013.01); *F16B 41/002* (2013.01)

(58) Field of Classification Search
CPC .......... B65B 7/00; F16B 35/041; F16B 35/06; F16B 41/002; G21F 5/12
See application file for complete search history.

(56) References Cited

U.S. PATENT DOCUMENTS 8,087,705 B2 * 1/2012 Littmann .............. G09F 3/0317
292/307 R
2008/0315596 A1 12/2008 Terry et al.

FOREIGN PATENT DOCUMENTS

EP 1 798 426 A1 6/2007
GB 2 067 699 A 7/1981

OTHER PUBLICATIONS

Extended European Search Report for corresponding European Application No. 16185837.8, dated Feb. 17, 2017, 7pp.
(Continued)

*Primary Examiner* — Christopher J Besler
*Assistant Examiner* — Christine Bersabal
(74) *Attorney, Agent, or Firm* — Lewis Roca Rothgerber Christie LLP

(57) ABSTRACT

A sealing bolt for sealing a container (e.g. for fissile materials), the sealing bolt adapted to cooperate, in use, with a locking device for locking a container lid to a container body of the container. The sealing bolt includes an upper part (i.e. adapted to be manipulated by an operator using a tool), a lower part (cooperating with the locking device 46) and an axial rod connecting the upper and lower parts, the upper part, lower part and axial rod being arranged coaxially about an axis. An integrity element is disposed in the upper part and a release arrangement (a detachable conical end-piece 24 retained by a ball 34 and recess 32 arrangement) is (Continued)

disposed so as to be releasably attached to the lower part. The sealing bolt is movable, through a first operator actuation of the upper part, from a first state, in which the integrity element is intact, to a second state, in which the integrity element of the sealing bolt is visibly broken. The sealing bolt is movable, through a second operator actuation of the upper part, from the second state to a third state, in which the release arrangement is released, thereby enabling disengagement of the locking device and removal of the lid from the container body. A locking system for a container, a method of releasably sealing a container, and a method of unsealing a container, are also disclosed.

3 Claims, 7 Drawing Sheets

(51) Int. Cl.
  *F16B 35/06* (2006.01)
  *B65B 7/00* (2006.01)
  *F16B 41/00* (2006.01)

(56) References Cited

OTHER PUBLICATIONS

International Search Reporting and Written Opinion for corresponding International Application No. PCT/EP2017/071518, dated Nov. 7, 2017, 13pp.

\* cited by examiner

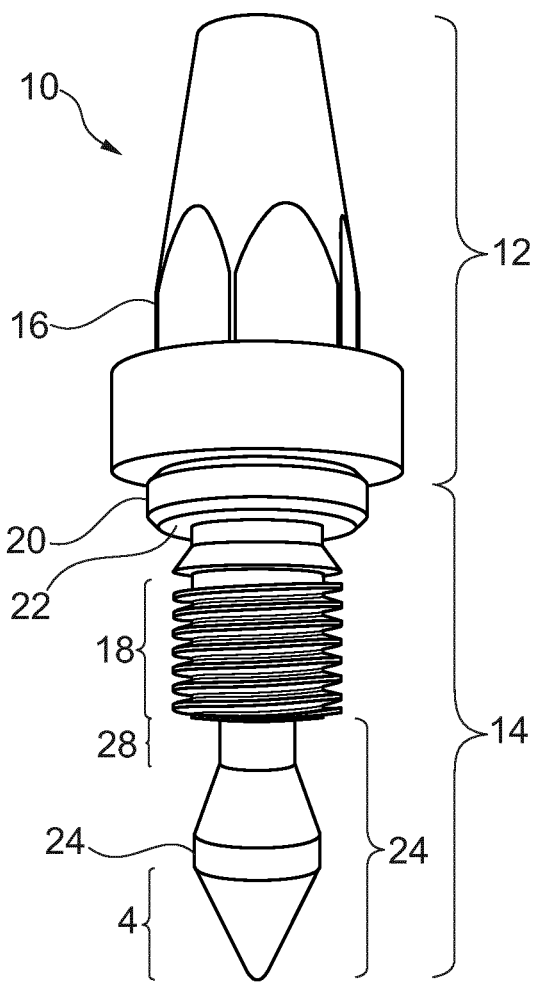
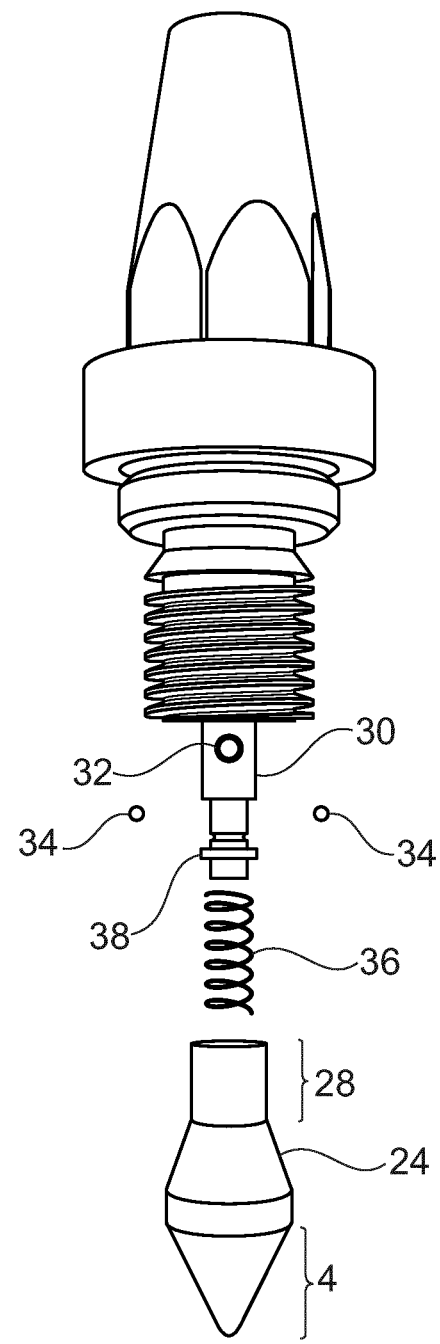
Fig. 1
Fig. 2

SEALING BOLT, LOCKING SYSTEM AND METHOD OF LOCKING/UNLOCKING

CROSS-REFERENCE TO A RELATED APPLICATIONS

This application is a National Phase Patent Application of International Patent Application Number PCT/EP2017/071518, filed on Aug. 28, 2017, which claims priority of and benefit to European Patent Application Number 16185837.8, filed on Aug. 26, 2016, the contents of all of which are incorporated herein by reference.

TECHNICAL FIELD

The present invention generally relates to a sealing bolt and locking system, in particular for sealing nuclear containers. Such a sealing bolt and locking system securely fixes a container lid to a container body and may comprise means for identifying the individual bolts or containers and/or indicating integrity. The invention further relates to a method of locking/unlocking a container.

BACKGROUND ART

Under some circumstances, the secure sealing of containers is necessary. It is of particular importance if such containers hold dangerous substances, such as for example fissile materials. In most cases, the container lid is connected to the container body by the use of at least one sealing bolt. Most often, such a sealing bolt contains some kind of integrity element, breaking in case of violation and thereby revealing that the container may have been tampered with. Such a breakable integrity element can be concealed somewhere within the sealing bolt, which makes it more difficult to differentiate between standard sealing bolts and sealing bolts with additional security features. Thereby, the number of sealing bolts with security features necessary to securely seal a container may be reduced.

An example of a sealing bolt in its most basic design is disclosed in GB-A-2067699. In one of the embodiments of the disclosure, the seal head is connected to its stud by a frangible integrity element that breaks at a given torque during the fastening process.

In certain circumstances, spent nuclear fuel is encapsulated in containers (e.g. copper canisters), each comprising a cylindrical container body and a container lid) and deposited under several meters of water. The container lid is locked to the container body using a locking mechanism operated with handling tools by operators, and incorporating a known sealing bolt. The upper part of the sealing bolt may be the conventional ultrasonic sealing bolt body with an identity and an integrity element that is broken when unscrewed. The lower part of the sealing bolt has a threaded shaft with a conical lower end, acting as a cam, pushing out a pushing rod that locks the system in place in order to forbid illicit access to spent nuclear fuel rods.

In case emergency, for example if there is the need to urgently remove some spent fuel rods, huge problems can arise in the event of malfunction of the locking mechanism, in particular if the sealing bolt is blocked or is not retractable/withdrawable for some reason.

It is known to provide solutions involving emptying the pond/lake, putting heavy lead sheet on the fuel containers to weight them down, and sending operators in for a few minutes each to cut the pushing rod to free the stacked locking mechanism. However, it is a heavy intervention and undesirable as operators would be exposed to high radiation doses.

Another possibility is designing a breakable pushing rod that is breakable with a crane in case of failure of the sealing bolt. However, such solution doesn't leave any trace of opening or tampering of the ultrasonic seal, and so it could be possible to remove and open the locking mechanism, replace the pushing rod without leaving visual evidence, remove the seal without breaking it, put back the locking system in the water and close it back. All these operations could be performed without leaving evidence of opening.

There is a need for sealing bolts, locking systems and methods that overcome the aforementioned issues.

Technical Problem

It is an object of the present invention to provide a destructible sealing bolt and/or locking system for a storage container for nuclear spent fuel that may be actuated by an operator to open the container in the event that the normal release mechanism fails and/or which demonstrates evidence of opening following such opening/destruction. It is a further object of the present invention to provide an openable locking system. It is a further object of the present invention to provide a method of locking/unlocking a container.

General Description of the Invention

The present invention relates to a sealing bolt for sealing a container, the sealing bolt adapted to cooperate, in use, with a locking device for locking a container lid to a container body of the container. The sealing bolt comprises an upper part, a lower part and an axial rod connecting the upper and lower parts, the upper part, lower part and axial rod being arranged coaxially so as to define an axis. The sealing bolt comprises an integrity element disposed in the upper part and a release arrangement disposed so as to be releasably attached to the lower part. The sealing bolt is movable, through a first operator actuation of the upper part, from a first state, in which the integrity element is intact, to a second state, in which the integrity element of the sealing bolt is visibly broken. The sealing bolt is movable, through a second operator actuation of the upper part, from the second state to a third state, in which the release arrangement is released, thereby enabling disengagement of the locking device and removal of the lid from the container body.

Preferably, the upper part includes a radially and/or longitudinally extending cavity configured to receive a radially extending finger attached to the lower part, thereby enabling axial motion of the upper part relative to the lower part.

Preferably, the upper part and axial rod are connected, whereby axial motion of the upper part causes, in use, corresponding axial motion of the axial rod.

Preferably, the second operator actuation comprises simultaneous, near simultaneous or sequential rotation of the upper part about the axis and axial force applied to the upper part.

Preferably, the release arrangement includes an end-piece having a first end adapted to engage a projection of the lower part and a second end, the second end having a conically tapered section.

Preferably, the end-piece and projection are disposed annularly and engage each other so as to have, at least in the first state and second state, opposing retaining recesses.

Preferably, the release arrangement includes one or more balls disposed in the retaining recesses, so as to retain the end-piece, at least in the first state and second state, in engagement with the projection.

Preferably, the release arrangement includes a biasing element axially urging, at least in the first state and second state, the end-piece away from the lower part.

Preferably, the axial rod includes a circumferential recess.

Preferably, the second operator actuation is such as to cause, in use, alignment of the circumferential recess with the retaining recesses, movement of the balls into the circumferential recess and detachment of the end-piece from the lower part under urging by the biasing element.

The invention further relates to a locking system for releasably locking a container lid to a container body of a container. The locking system comprises a sealing bolt and a locking bolt adapted to be engaged, in use, by the release arrangement of the sealing bolt. The locking bolt is adapted to move, in use, between a first position, in which the locking bolt engages the container body and prevents removal of the lid from the container body, and a second position, in which the locking bolt is disengaged from the container body and enables removal of the lid from the container body. Movement of the sealing bolt from the second state to the third state causes, in use, movement of the locking bolt between the first position and the second position.

The invention further relates to a method of releasably sealing a container, comprising: providing the container having a container lid and a container body; providing a sealing bolt; sealing the container lid to the container body with the sealing bolt.

The invention further relates to a method of unsealing a container, the container having been sealed using the sealing bolt and/or having been sealed using the method comprising: performing the first operator actuation; and performing the second operator actuation.

Preferably, performing the second operator actuation comprises simultaneously, near-simultaneously or sequentially rotating of the upper part about the axis and applying an axial force to the upper part.

Preferably, performing the second operator actuation comprises rotating of the upper part about the axis until a radially extending cavity in the upper part is aligned with a radially extending finger on the lower part.

BRIEF DESCRIPTION OF THE DRAWINGS

Further details and advantages of the present invention will be apparent from the following detailed description of several not limiting embodiments with reference to the attached drawings, wherein:

FIG. 1 is a view of a sealing bolt in accordance with an embodiment of the invention;

FIG. 2 is an exploded view of the sealing bolt of FIG. 1;

DESCRIPTION OF PREFERRED EMBODIMENTS

Figure 3:
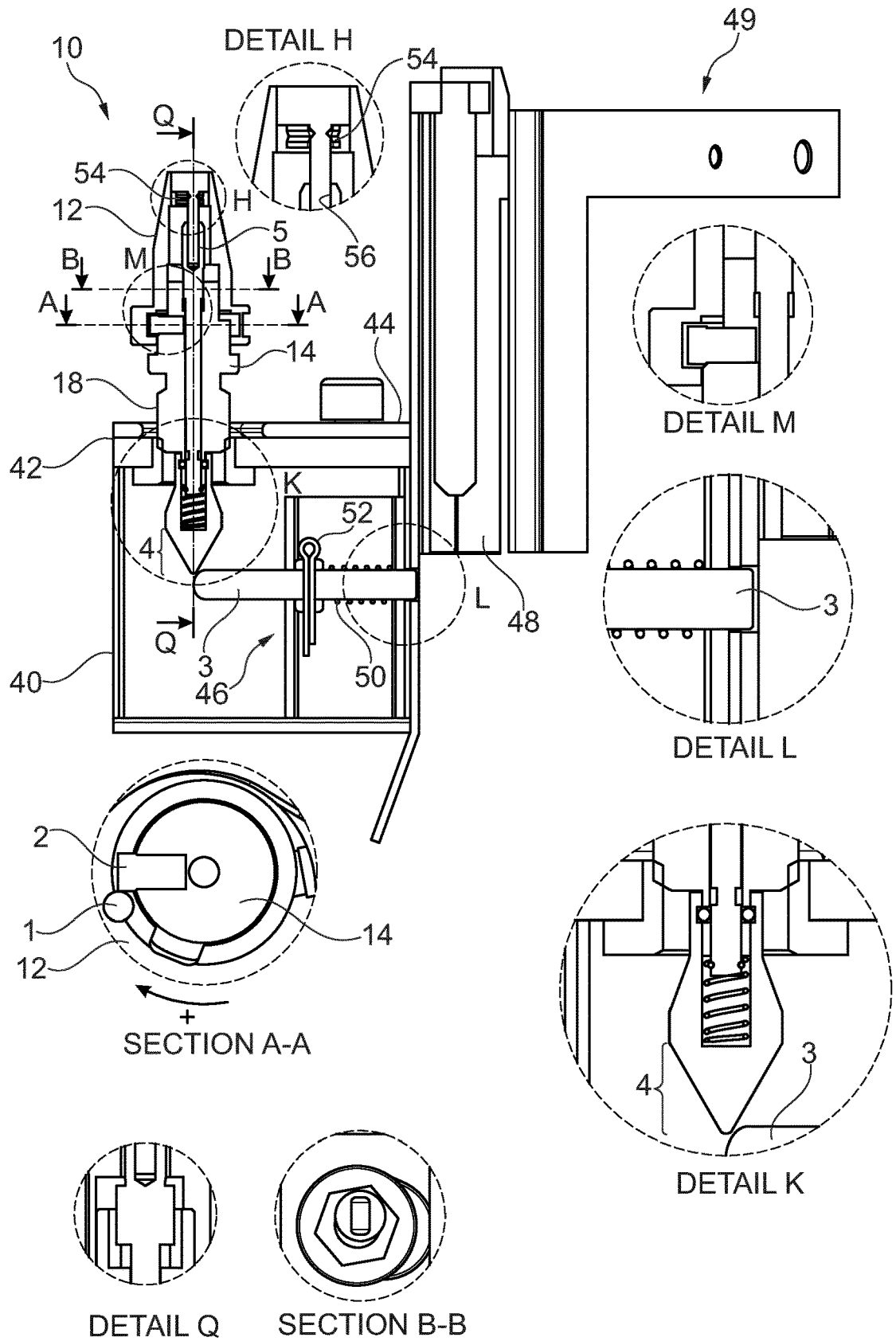
FIG. 3 is a diagram illustrating the use of the sealing bolt of FIG. 1 in embodiments of the invention—in a first state.

FIG. 1 is a view of a sealing bolt 10 in accordance with an embodiment of the invention. The sealing bolt 10 comprises an upper part 12 and a lower part 14, the upper part 12 being rotatable relative to the lower part 14 by means of an internal axial rod (not shown). The upper part 12 includes a drive portion 16, e.g. hex-shaped portion, enabling actuation (rotation clockwise or anti-clockwise) of the upper part 12 by an operator using a corresponding tool (not shown).

The lower part 14 includes a screw-threaded portion 18 enabling the sealing bolt 10 to be screwed onto an upper wall (not shown) of a locking box (not shown) of a container lid (not shown), as will be discussed in further detail below. The lower part 14 also includes a mounting shoulder 20 including a shoulder surface 22 for abutting the upper wall (not shown) of the locking box (not shown) when the sealing bolt 10 has been screwed onto the container lid (not shown). At the end of the lower part 14 opposite the upper part 12, the lower part 14 includes an end-piece 24 having a first end section 26, preferably conically-tapering, for engaging a locking bolt (not shown) for locking and unlocking the container (not shown), as will be discussed hereinafter.

In accordance with an embodiment of the invention, the end-piece 24 is releasably/detachably mounted to the lower part 14. In this respect, FIG. 2 is an exploded view of the sealing bolt 10 of FIG. 1. As can be seen, the end-piece 24 includes a second end section 28 that is shaped to slide over, engage with and releasably attach to a cylindrical projection 30 of the lower part 14. In particular, in this embodiment, the cylindrical projection 30 includes circular holes 32 for receiving retaining balls 34 (e.g. ball bearings). (In the normal, assembled state (FIG. 1) of the sealing bolt 10, the balls 34 are partially received by circular holes 32 but prevented from moving further inwards by the outer surface of the aforementioned axial rod, as discussed in further detail below.) Finally, in this embodiment, the second end section 28 includes internal recesses (not shown), e.g. circular recesses, for partially receiving the balls 34. Thus, in the state of FIG. 1, the end-piece 24 is attached to the lower part 14 by the balls 34 being simultaneously located in the internal recesses of second end section 28 and in circular holes 32 of projection 30. A first compression spring 36 engages, at one end, annular shoulder 38 on projection 40, and at the other end, the end-piece 24; thus, in the state in FIG. 1, the end-piece 24 is biased away from the projection 30.

In the following, the features and precise working principle of the sealing bolt 10 and associated locking device for locking and releasing a lid of a container will be described, with reference to various states/conditions (1 to 6) thereof, as illustrated in FIGS. 3-8, respectively. Up to state 4, the sealing bolt 10 is behaving exactly as a standard sealing bolt. The container is suitably a container for fissile or other hazardous materials (e.g. nuclear fuel rods), and the additional functions of the present invention are used only in case of necessity/emergency, e.g. if the sealing bolt 10 is stacked/jammed in the locking box/container lid for any reason.

State 1: Sealing Bolt in Upper Position, Inserted in the Locking Box, Locking Rod IN FIG. 3 is a diagram illustrating the use of the sealing bolt 10 of FIG. 1 in embodiments of the invention—in a first state. Within a locking box 40 mounted to an end-wall 42 of container lid 44 is a locking device, generally designated 46. The latter includes a locking rod 3 arranged for horizontal (radial) movement relative to the container lid 44 and urged to move outwardly (direction of arrow A) by virtue of first biasing element (e.g. a compression spring 50) and retaining pin 52 that passes through the locking bolt 3. As will be described hereinafter, the locking bolt 3 can be used to lock container lid 44 to container body 48 of nuclear container 49.

Inside the upper part 12 of sealing bolt 10 is an integrity element 54 (portion of reduced cross-section), as is well known in the art. A lower portion of the integrity element 54 and an upper portion of an axial rod 5 (which permits rotation of the upper part 12) are welded together, as indicated by weld 56.

As seen in FIG. 3, within the locking box 40, the locking rod 3 is in position IN, but the sealing bolt 10 is already threaded partially onto the locking box 40. The locking mechanism (sealing bolt 10 with locking box 40) is put into the water and disposed above the hangers (not shown) where the spent nuclear fuel is stored. Once in position, an operator (nuclear inspector) comes and screws in the sealing bolt 10.

In this state, the integrity element 54 is unbroken (seal integer), as shown best in Detail H in FIG. 3. In addition, the rod 3 is in the release position, IN, as best illustrated in Detail L in FIG. 3. Further, as shown best in Section AA in FIG. 3, the sealing bolt 10 is in the tightening/screwing in position, the upper part 12 is driving the lower part 14 in the clockwise direction (+ arrow), with the vertical pin (marked 1) on the upper part 12 pushing in rotation the horizontal finger 2 on the lower part 14. Both upper part 12 and lower part 14 are turning in the same (clockwise) direction. At the lower end of sealing bolt 10 the conical first end section 4 is not yet touching the locking rod 3, as seen in Detail K in FIG. 3. The sealing bolt 10, up to now, is behaving exactly like a standard bolt seal.

State 2: Sealing Bolt 10 Fully Inserted, Tightened, Locking Rod 3 OUT

Figure 4:
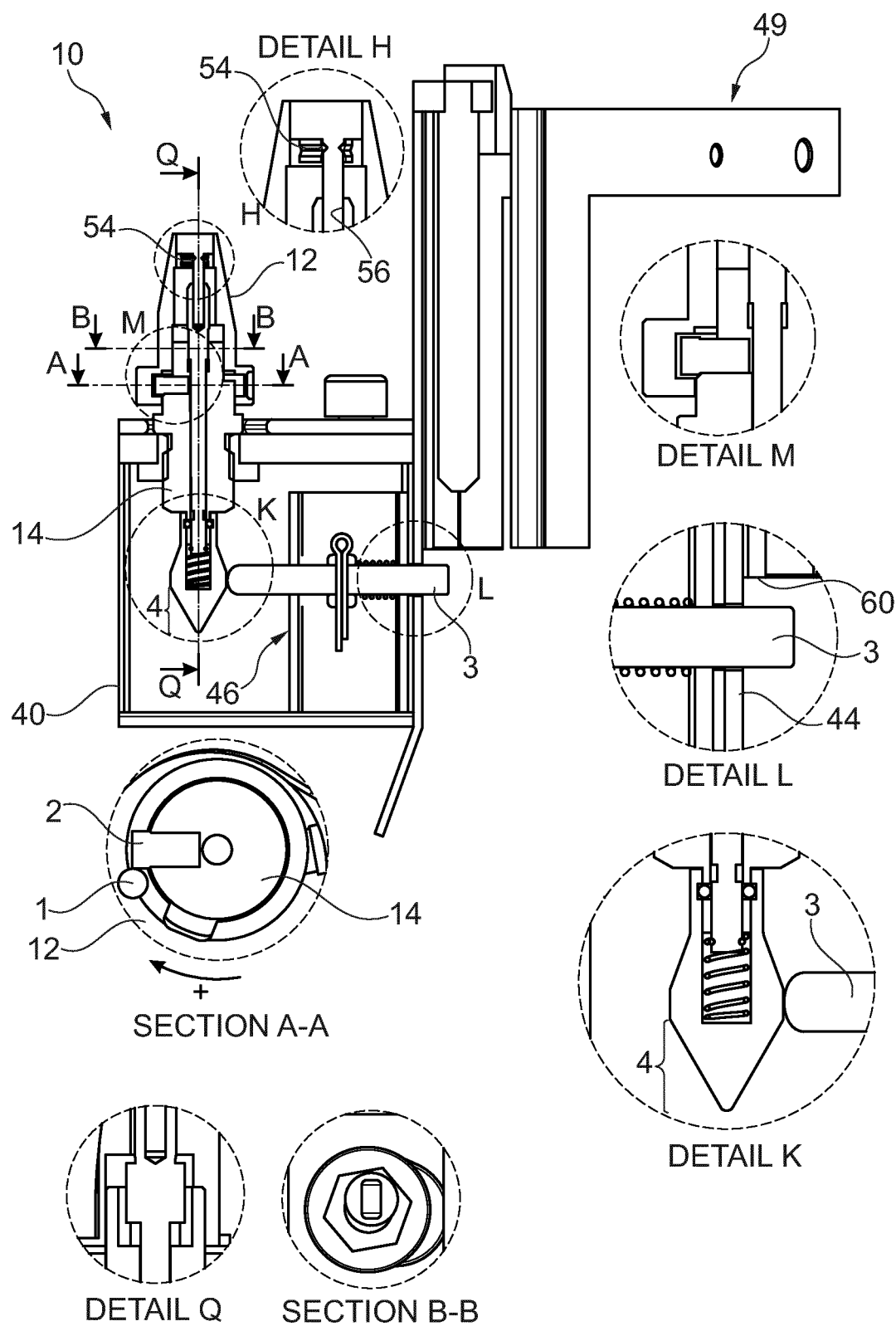
FIG. 4 is a diagram illustrating the use of the sealing bolt of FIG. 1 in embodiments of the invention—in a second state.

FIG. 4 is a diagram illustrating the use of the sealing bolt 10 of FIG. 1 in embodiments of the invention—in a second state. As can be seen, within the locking box 40, the rod 3 is in position OUT, the sealing bolt 10 has been fully tightened onto the locking box 40 by the inspector using a long-handled tool. The locking device 46 is closed and the container 49 of spent fuel is now considered sealed.

In this state, the integrity element 54 is unbroken (seal integer), as shown best in Detail H in FIG. 4. In addition, as shown best in Section AA in FIG. 4, the sealing bolt 10 is still in the tightening/screwing in position, the upper part 12 is driving the lower part 14 in the clockwise direction (+ arrow), with the vertical pin 1 on the upper part 12 pushing in rotation the horizontal finger 2 on the lower part 14. Both upper part 12 and lower part 14 are turning in the same (clockwise) direction. At the lower end of sealing bolt 10 the conical first end section 4 is pushing on the locking rod 3, which is completely OUT, as seen in Detail K in FIG. 4. As seen in Detail L, the locking rod 3 is in the position OUT—pushed by the conical first end section 4. The protrusion of the end of locking rod 3 from the locking box 40 means that opening of the container lid 44 is prevented, i.e. by end surface 60 of container body 48.

The sealing bolt 10, up to now, is behaving exactly like a standard bolt seal.

State 3: Sealing Bolt 10 Fully Inserted, Tightened, Locking Rod 3 OUT

Figure 5:
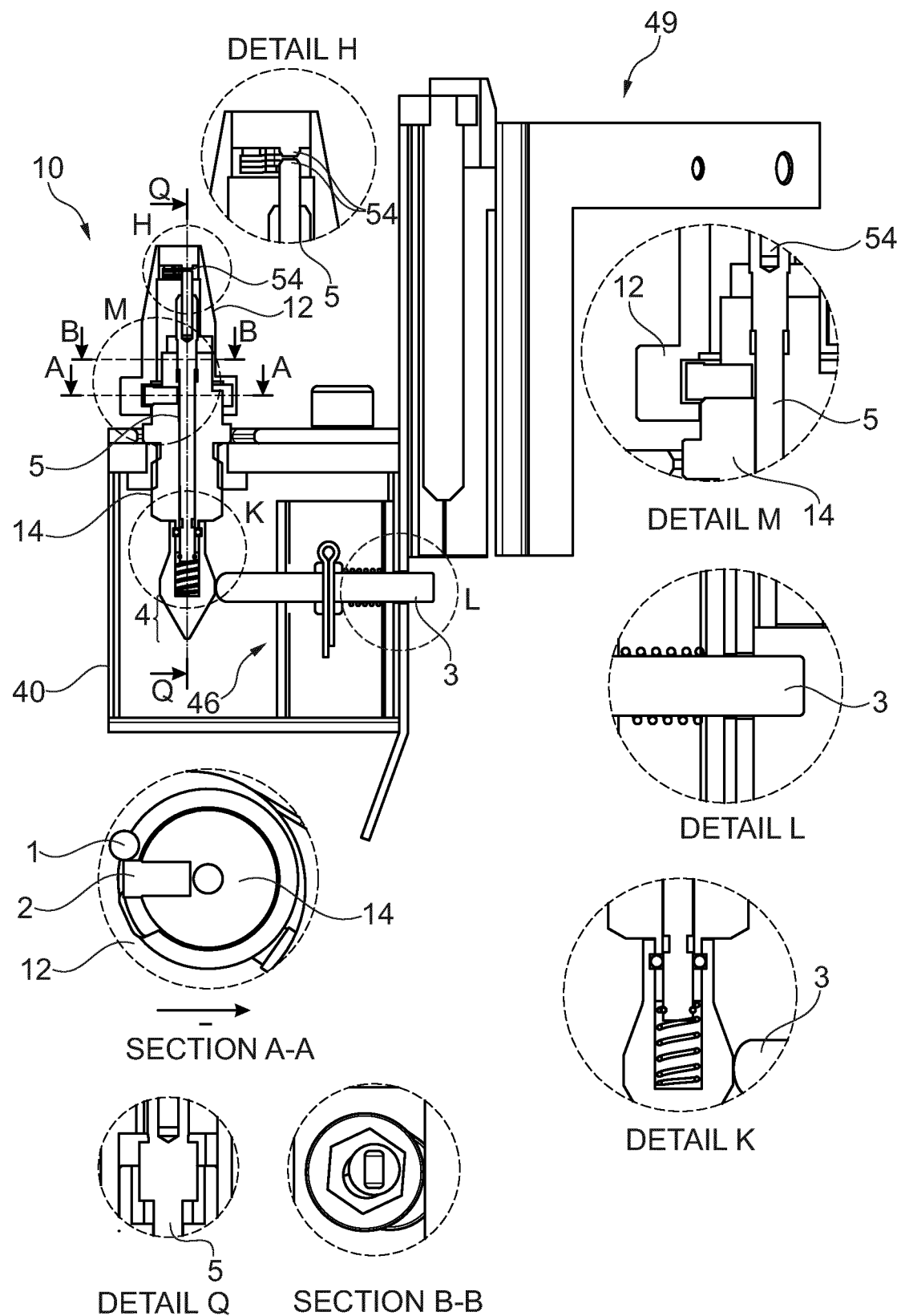
FIG. 5 is a diagram illustrating the use of the sealing bolt of FIG. 1 in embodiments of the invention—in a third state.

FIG. 5 is a diagram illustrating the use of the sealing bolt 10 of FIG. 1 in embodiments of the invention—in a third state. As seen in FIG. 5, within the locking box 40 the locking rod 3 is still in position OUT (as shown in Detail L in FIG. 5), pushed by the conical first end section 4, because the lower part 14 of the sealing bolt 10 hasn't moved. The sealing bolt 10 is still fully tightened on the locking box 40.

Further, the inspector has just turned the upper part 12 of sealing bolt 10 anti-clockwise using the handling tool (not shown). That is, the upper part 12 has been turned (arrow with - direction), until the pin 1 engages again finger 2 (section AA). More particularly, as seen in Section AA in FIG. 5, the upper part 12 freely turns in the anti-clockwise direction (− arrow), until the vertical pin 1 on the upper part 12 is blocked by the horizontal finger 2 on the lower part. The upper part 12 has turned about 300° and the lower part 14 remained fixed.

Through this rotation, the integrity element 54 is now broken (see Detail H), because the integrity element 54 is linked in rotation with the axial rod 5, and the sealing bolt 10 is considered (and is visibly) open. This axial rod 5 has rectangular cross-sectional shape which prevents rotation around the vertical axis (see Detail Q, Detail M and Section BB in FIG. 5). Thus, when the upper part 12 turns and the lower part 14 is fixed, the axial rod 5 is also fixed and as a consequence the integrity element 54 linking the two breaks in torsion. The locking device 46 is still closed, but now the container 49 of spent fuel is considered unsealed because the integrity element 54 of the sealing bolt 10 has been broken by the inspector.

As before, the conical first end section 4 is still pushing on the locking rod 3, which is completely OUT (see Detail K in FIG. 5). The seal, up to now is behaving exactly as a standard bolt seal, and is now broken.

Figure 6:
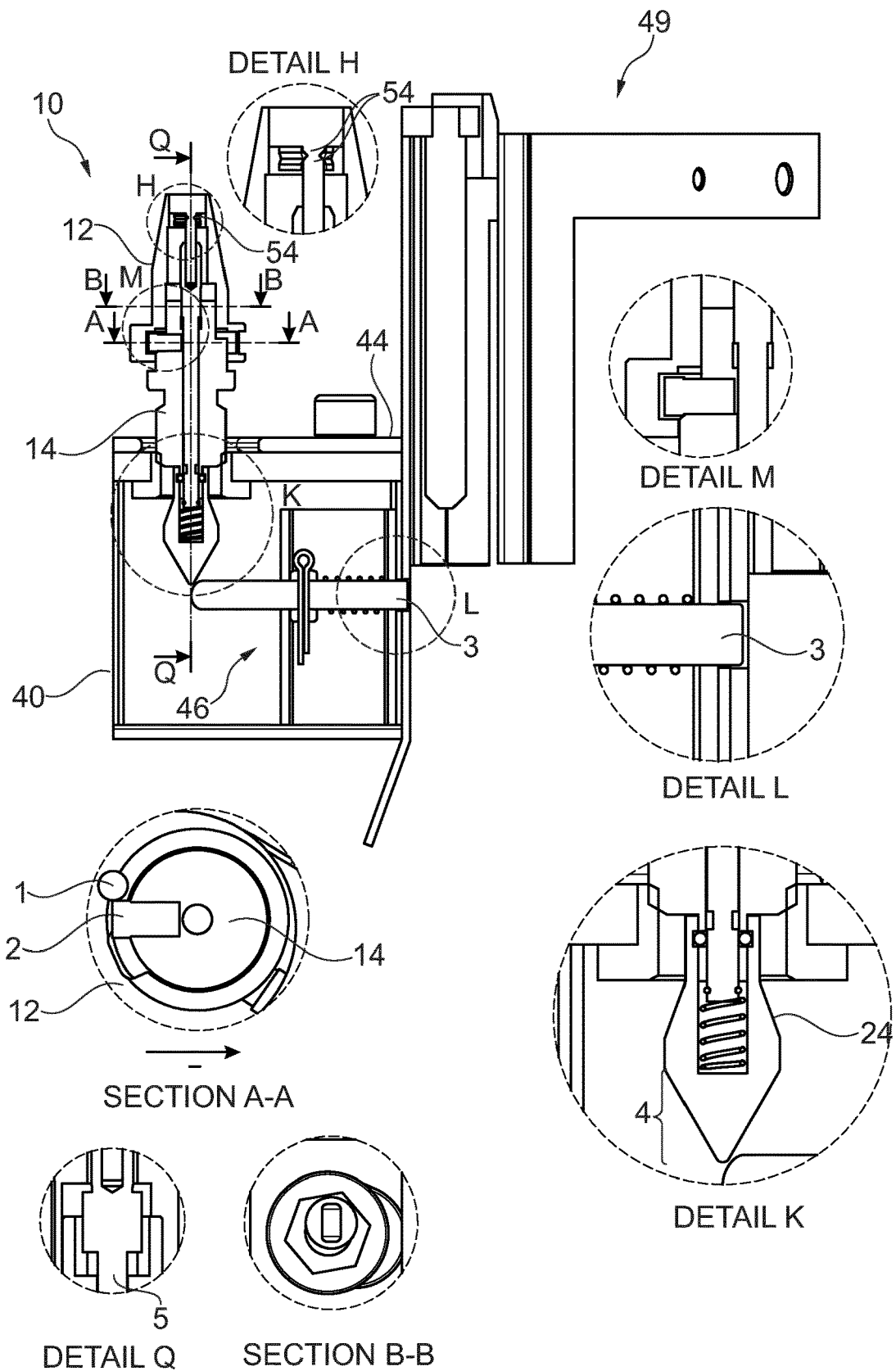
FIG. 6 is a diagram illustrating the use of the sealing bolt of FIG. 1 in embodiments of the invention—in a fourth state.

State 4: Sealing Bolt 10 In Upper Position, Inserted in the Locking Box 40, Locking Rod 3 IN FIG. 6 is a diagram illustrating the use of the sealing bolt 10 of FIG. 1 in embodiments of the invention—in a fourth state. This illustrates a manipulation by an operator to remove sealing bolt 10 when the latter is functioning properly. In FIG. 6 it can be seen that, within the locking box 40, the locking rod 3 is in position IN, and the sealing bolt 10 has been unscrewed (integrity element 54 broken). The inspector has continued to turn the (upper part 12 of) sealing bolt 10 anti-clockwise with the handling tool (not shown). The upper part 12 of the seal has driven the lower part 14 (via pin 1 in contact with finger 2 and in the direction of the − arrow). With enough torque, it has been possible to unscrew the lower part 14 and raise the sealing bolt 10. As a consequence, the conical first end section 4 has released the locking rod 3. The locking device 46 is now open and the sealing bolt 10 and container lid 44 can be freely removed by the operator to access spent fuel bars.

In this state, the integrity element is broken, and the sealing bolt 10 considered open, as seen in Detail H in FIG. 6. In addition, as seen in Section AA in FIG. 6, the upper part 12 is driving the lower part 14 in the anti-clockwise direction (− arrow), the vertical pin 1 on the upper part 12 is pushing in rotation the horizontal finger 2 on the lower part 14. Both upper and lower bodies are turning in the same direction (anti-clockwise). The sealing bolt 10 is raised, the locking rod 3 has returned to position IN because the first end section 4 is raised—see Detail L in FIG. 6—is no longer touching the locking rod 3, as seen in Detail K. Up to now the sealing bolt 10 is behaving exactly as a standard bolt seal.

State 5: Seal Fully Inserted but Stacked, Integrity Element Broken, Locking Rod OUT, Ready to "Explode"

Figure 7:
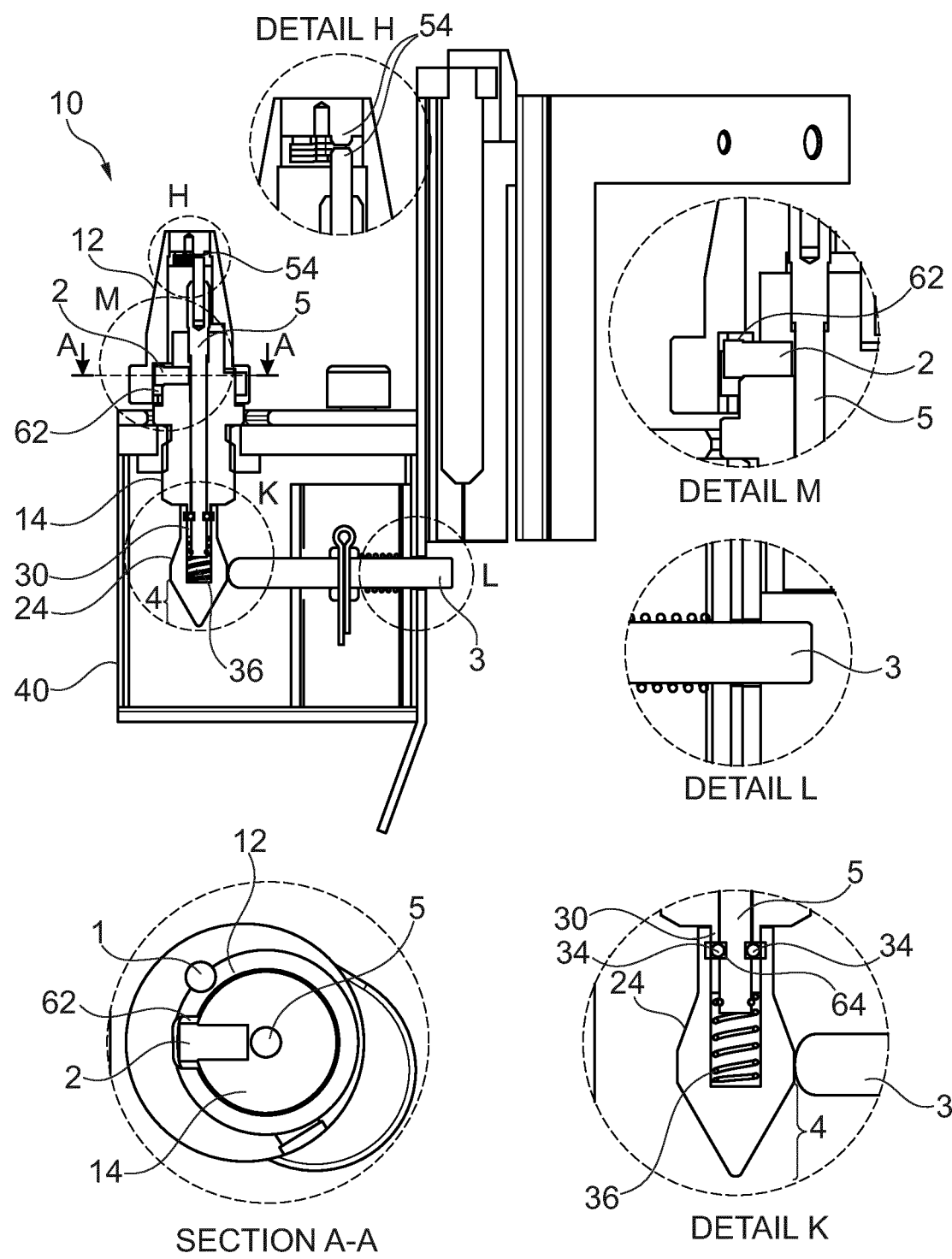
FIG. 7 is a diagram illustrating the use of the sealing bolt of FIG. 1 in embodiments of the invention—in a fifth state.

FIG. 7 is a diagram illustrating the use of the sealing bolt 10 of FIG. 1 in embodiments of the invention—in a fifth state. If, for any reason, the sealing bolt 10 is stacked/jammed on the thread and it is as a consequence impossible to achieve correctly or completely the above-described state 4, the inspector can decide to go to a special state 5, which is used only in case of emergency or necessity.

As seen in FIG. 7, within the locking box 40, the locking rod 3 is in position OUT (detail L) and the sealing bolt 10 is still fully tightened on the locking box 40. The inspector has just turned the upper part 12 clockwise approximately 15° to 20°, while pushing it down with the ad-hoc handling tool (not shown). In Section AA and Detail M in FIG. 7, it can be seen that the finger 2 on the lower part 14 is in the middle of a longitudinal cavity 62 in the upper part 12, which enables the upper part 12 to "drop down" a few mm when the upper part 12 is pushed by the inspector. Following this action, the axial rod 5 is pushed down by the upper part 12, even if the integrity element 54 is broken (Detail H in FIG. 7). The axial rod 5 is prevented from rotation but can translate axially (vertically). In Detail K in FIG. 7, it can be seen that the two balls 34 retaining the conical first end section 4 are now adjacent a circular cavity 64 formed in the axial rod 5 and can thus move. This means that the end-piece 24, which is spring loaded, will now be ejected downwards, freeing the locking rod 3 and unlocking the locking device, as discussed below in relation to FIG. 8.

Thus, in state 5, the integrity element 54 is broken and the sealing bolt 10 considered open. The upper part 12 of the sealing bolt 10 engages the axial rod 5 while being pushed down (see Detail H in FIG. 7). In addition, as seen in Section AA in FIG. 7, the upper part 12 has been turned clockwise 15 to 20°, and while being pushed down finger 2 will drop down within the longitudinal cavity 62. In this particular angular position, the upper body can move down, pushing on the central rod 5 (see Detail M in FIG. 7).

Further, in this state, the conical first end section 4 is still pushing on the locking rod 3, which is completely OUT, but the two balls 34 are now adjacent the circular cavity 64 on the axial rod 5, enabling the balls 34 to move inwards and cease the retention of end-piece 24 on projection 30, which means that under the force provided by the spring 36, the end-piece 24 will move down (see Detail K in FIG. 7). The locking rod 3 is still out, but will return to position IN as soon as the end-piece 24 is ejected.

State 6: Sealing Bolt 10 "Exploded" and Locking Rod 3 IN

Figure 8:
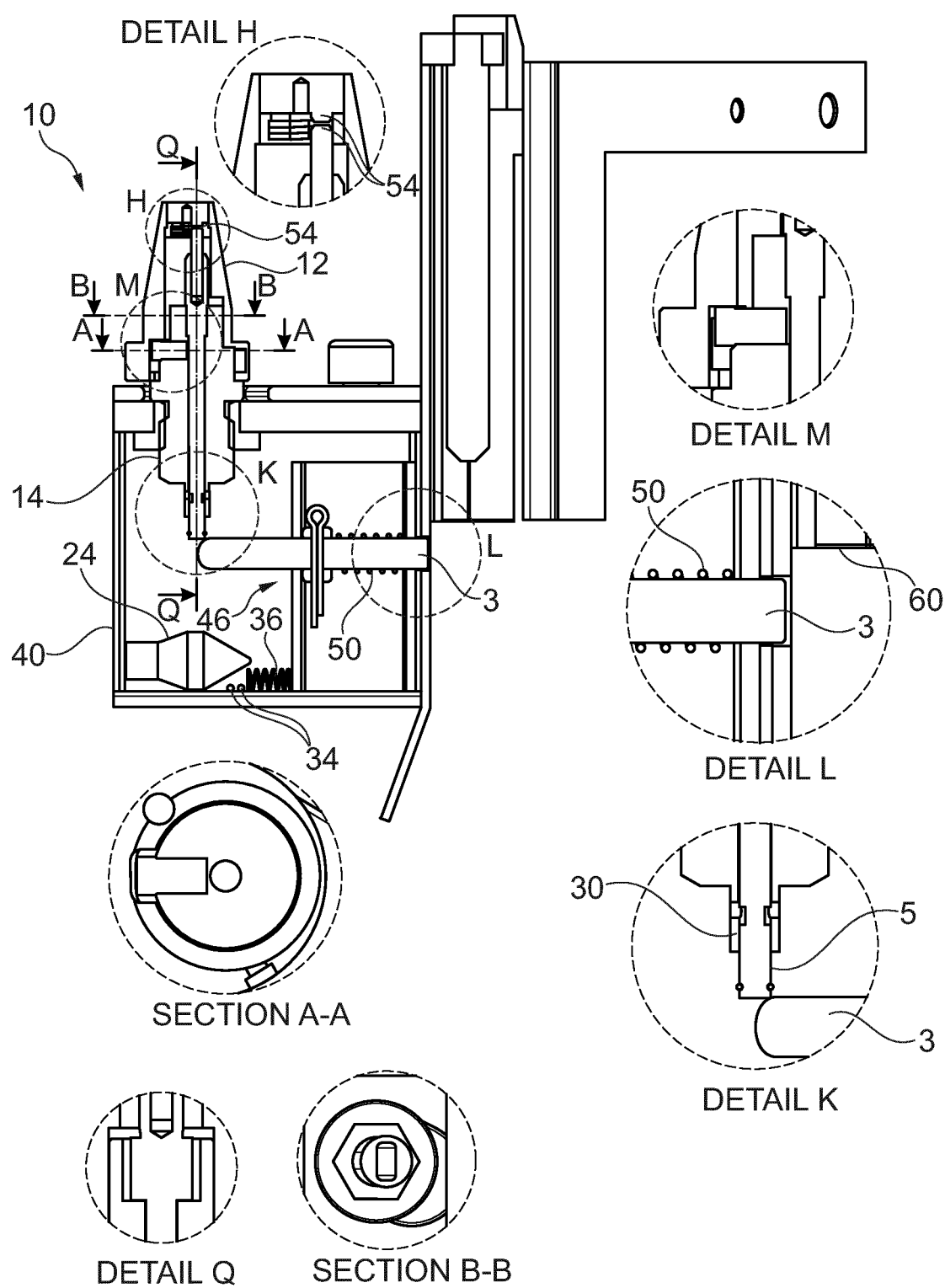
FIG. 8 is a diagram illustrating the use of the sealing bolt of FIG. 1 in embodiments of the invention—in a sixth state.

FIG. 8 is a diagram illustrating the use of the sealing bolt 10 of FIG. 1 in embodiments of the invention—in a sixth state: this is the final state in case emergency. The inspector has used this procedure to first break the integrity element 54 of the sealing bolt 10 to leave evidence of opening and then has turned and pushed the upper part 12 of the sealing bolt 10 with the handling tool (not shown). The spring loaded mechanism (spring 36 with balls 34) has been released, the end-piece 24 has been pushed down and the locking device 46 has been unlocked.

Thus, in this state, the end-piece 24, the spring 36 and the two balls 34 have been ejected and are laying on the bottom of the locking box 40: the absence of the end-piece 24 is shown in Detail K in FIG. 8. The locking rod 3 has been pushed back by the spring 50 and is now in position IN, as shown in Detail L in FIG. 8.

It is possible now to remove the whole sealing/locking mechanism to have access to the nuclear spent fuel bars within the container 49.

While embodiments have been described by reference to embodiments of survey devices having various components in their respective implementations, it will be appreciated that other embodiments make use of other combinations and permutations of these and other components.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

LEGEND

1 vertical pin
2 horizontal finger
3 locking rod
4 first end section
5 axial rod
10 sealing bolt
12 upper part
14 lower part 16 drive portion
18 screw-threaded portion
20 mounting shoulder
22 shoulder surface
24 end-piece
28 second end section
30 cylindrical projection
32 circular holes
34 retaining balls 34
36 first compression spring
38 annular shoulder
40 locking box
42 end-wall
44 container lid
46 locking device
48 container body
49 container
50 second compression spring
52 retaining pin
54 integrity element
56 weld
60 end surface
62 longitudinal cavity
64 circular cavity

The invention claimed is:

1. A method of releasably sealing a container, comprising:
providing the container having a container lid and a container body;
providing a sealing bolt for sealing the container, the sealing bolt adapted to cooperate, in use, with a locking device for locking a container lid to a container body of the container, said sealing bolt comprising:
an upper part, a lower part and an axial rod connecting the upper and lower parts, the upper part, lower part and axial rod being arranged coaxially about an axis, the axial rod including a circumferential recess;
an integrity element disposed in the upper part; and
a release arrangement disposed so as to be releasably attached to the lower part,
wherein the release arrangement includes an end-piece and projection that are annularly disposed with respect to one another and engage one another to form retaining recesses, balls disposed within the retaining recesses, and a biasing element that axially urges the end-piece away from the lower part;
sealing the container lid to the container body with the sealing bolt;
moving the sealing bolt by performing a first actuation of the upper part, from a first state, in which the integrity element is intact, to a second state, in which the integrity element of the sealing bolt is visibly broken;
further moving the sealing bolt by performing a second actuation of the upper part from the second state to a third state in which the release arrangement is released,
wherein the performing the second actuation causes alignment of the circumferential recess with the retaining recesses, movement of retained balls into the circumferential recess and detachment of the end-piece from the lower part under urging of the biasing element; and
disengaging the locking device and removing the lid from the container body.

2. The method of claim 1, wherein performing the second operator actuation comprises simultaneously, near-simultaneously or sequentially rotating of the upper part about the axis and applying an axial force to the upper part.

3. The method of claim 1, wherein performing the second operator actuation comprises rotating of the upper part about the axis until a radially extending cavity in the upper part is aligned with a radially extending finger on the lower part.

* * * * *